United States Patent [19]

Sugiura et al.

[11] Patent Number: 4,819,063
[45] Date of Patent: Apr. 4, 1989

[54] DATA PROCESSING SYSTEM WITH COMMON CHANNEL FOR IMAGE AND CHARACTER DATA

[75] Inventors: Susumu Sugiura, Yamato; Osamu Hoshino, Tokyo, both of Japan

[73] Assignee: Canon Kabushiki Kaisha, Tokyo, Japan

[21] Appl. No.: 193,235

[22] Filed: May 11, 1988

Related U.S. Application Data

[63] Continuation of Ser. No. 30,271, Mar. 20, 1987, abandoned, which is a continuation of Ser. No. 589,342, Mar. 14, 1984, abandoned.

[30] Foreign Application Priority Data

Mar. 17, 1983 [JP] Japan ................................ 58-44994

[51] Int. Cl.[4] .......................... H04N 1/46; H04N 1/40
[52] U.S. Cl. ........................................ 358/75; 358/280
[58] Field of Search ................... 358/75, 78, 80, 280

[56] References Cited

U.S. PATENT DOCUMENTS

| | | | |
|---|---|---|---|
| 4,004,079 | 1/1977 | Boston | 358/280 |
| 4,034,400 | 7/1977 | Owen et al. | 358/75 |
| 4,200,769 | 4/1980 | Heinzl | 178/30 |
| 4,496,989 | 1/1985 | Hirosawa | 358/75 |
| 4,553,172 | 11/1985 | Yamada et al. | 358/75 |
| 4,628,366 | 12/1986 | Yamada | 358/280 |
| 4,641,197 | 2/1987 | Miyagi | 358/280 |

FOREIGN PATENT DOCUMENTS

| | | |
|---|---|---|
| 2127516 | 12/1972 | Fed. Rep. of Germany . |
| 2255887 | 5/1974 | Fed. Rep. of Germany . |
| 2516332 | 10/1976 | Fed. Rep. of Germany . |
| 2748253 | 5/1979 | Fed. Rep. of Germany . |
| 54-102825 | 8/1979 | Japan ............... 358/75 |
| 57-141169 | 9/1982 | Japan . |
| 58-1377 | 1/1983 | Japan ............... 358/75 |
| 2089165 | 6/1982 | United Kingdom . |
| 2102240 | 1/1983 | United Kingdom ........... 358/75 |

OTHER PUBLICATIONS

Patent Abstracts of Japan, vol. 6, No. 243 (E-145) [1121], Dec. 2, 1982 (Kokai 57-141169).

*Primary Examiner*—James J. Groody
*Assistant Examiner*—Randall S. Svihla
*Attorney, Agent, or Firm*—Fitzpatrick, Cella, Harper & Scinto

[57] ABSTRACT

A data processing system, in which image data is transmitted in units of predetermined length, e.g., a predetermined number of lines, and code data comprising a character or the like, is transmitted in units each of which contains the code data corresponding to the predetermined unit of the image data. The image and the code data are preferably transmitted on a common transmission channel, and can be separated upon reception for separate processing.

70 Claims, 7 Drawing Sheets

DATA PROCESSING SYSTEM WITH COMMON CHANNEL FOR IMAGE AND CHARACTER DATA

This application is a continuation of application Ser. No. 30,271 filed Mar. 20, 1987, now abandoned, which is a continuation of application Ser. No. 589,342 filed Mar. 4, 1984, now abandoned.

BACKGROUND OF THE INVENTION

1. Field of the Invention

The present invention relates to a data processing system capable of processing data of different kinds, such as code data representing characters and symbols and image data representing image density.

2. Description of the Prior Art

In the case of processing data of different kinds such as code data representing characters, symbols, etc., and image data representing image density, there may be employed separate transmission channels for transmitting the respective kinds of data for data processing. Such an arrangement is, however, undesirable since there are required plural transmission channels according to the kinds of data, leading to a high cost, particularly in the case of long-distance transmission.

On the other hand, in the case of transmitting data of different kinds through a common transmission channel, it has been necessary to provide the receiving unit with a memory of a large capacity for storing all the transmitted data in said memory and to inspect the stored data for identifying the kind thereof. Such an arrangement is not only costwise undesirable but also is unsuitable for real-time processing since the identification of data content requires time.

In either case, the above-mentioned drawbacks become more serious as the number of kinds of data increases.

SUMMARY OF THE INVENTION

In consideration of the foregoing, an object of the present invention is to provide a data processing system capable of transmitting data of various kinds exactly, using a simple structure.

Another object of the present invention is to provide a data processing system capable of identifying and processing, on a real-time basis, transmitted data of different kinds.

Still another object of the present invention is to provide a data processing system capable of securely identifying and separating mixed data of different kinds.

Still another object of the present invention is to provide a data processing system adapted for reproducing a synthesized image from data of different kinds.

Still another object of the present invention is to provide a data processing system capable of easily synthesizing characters, symbols, etc., with an image read from an original document.

The foregoing and still other objects of the present invention will become fully apparent from the following description.

BRIEF DESCRIPTION OF THE DRAWINGS

FIG. 7, comprising

DETAILED DESCRIPTION OF THE PREFERRED EMBODIMENTS

Now the present invention will be clarified in greater detail by embodiments thereof shown in the attached drawings.

Figure 1:
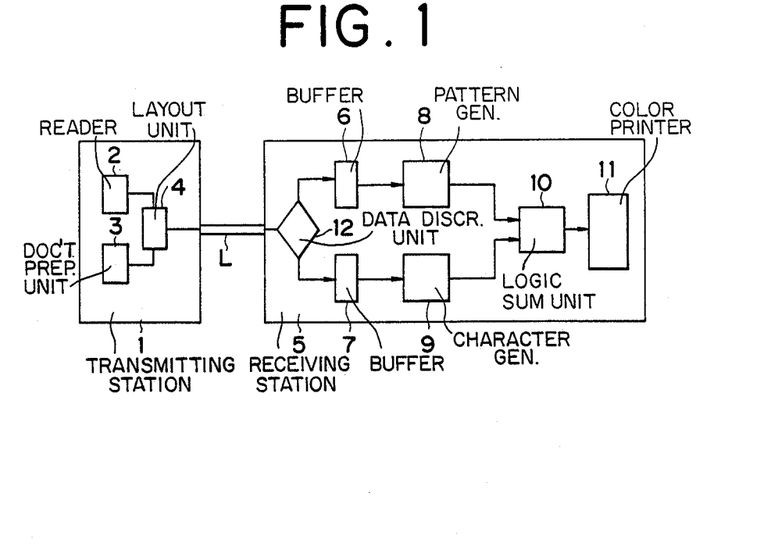
FIG. 1 is a block diagram of a data transmission system embodying the present invention.

FIG. 1 shows, in a block diagram, an embodiment of the data transmission system employing the data transmission method of the present invention, wherein a transmitting station 1 is provided with an image reading unit 2 for photoelectrically reading a color-separated original image with an image sensor such as a charge-coupled device (CCD) to generate image data representing the image density through the use of density patterns to be explained later; a document preparation unit 3 for forming character information composed of characters, symbols, etc., according to input data from keys or tablets to generate code data representing characters, symbols, etc., for example in the form of ASCII code; and a layout unit 4 for editing (for example by relocation, enlargement, reduction, erasure, extraction, etc.) the image data from the image reading unit 2 and the code data from the document preparation unit 3 according to predetermined formats or according to manual instructions to be given from keys or a digitizer, and releasing or outputting the corresponding data. The data edited in the layout unit 4 are supplied to a transmission channel L composed for example of an optical fiber or a telephone line. Consequently the image data and the character code data are mixedly present on the transmission channel L. The transmission on the channel L may be conducted either in the form of NRZ signals or in the form of modulated signals, for example MFM (modified frequency modulation) modulation. In this form the image information obtained from the original is not transmitted in its original form but in the form of data representing a density pattern, so that the efficiency of transmission is improved by the reduction in the quantity of transmission relating to such image information.

Figure 4:
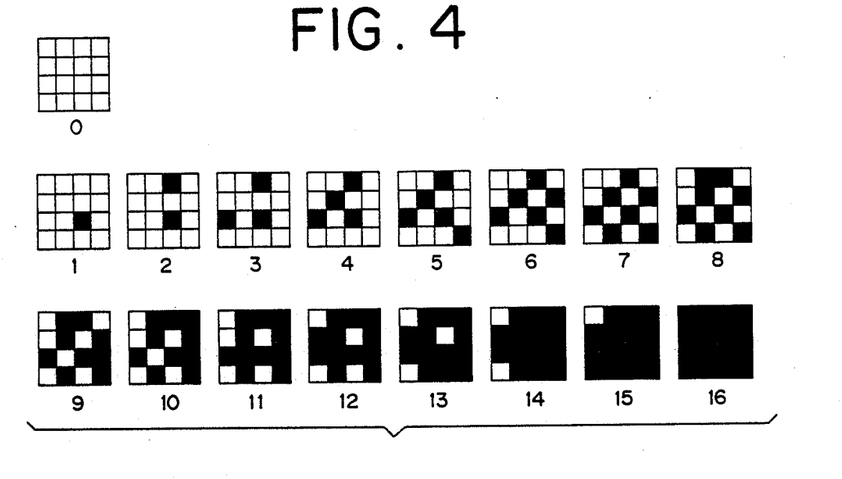
FIG. 4 is a chart showing density patterns.

A receiving station 5 discriminates, in a data discriminating unit 12, the data transmitted through the transmission channel L by means of discrimination code of 4 bits preceding said data, and the data are guided to a suitable processing circuit according to the result of said discrimination. More specifically, image data are supplied, through a buffer memory 6, to a pattern generator 8 which stores, as shown in FIG. 4, 17 dot patterns representing various densities by different arrangements of white and black dots in 4×4 matrix. On the other hand, the code data are supplied, through a buffer memory 7, to a character generator 9 equipped with a font memory storing fonts of characters, symbols, etc.

The output signals from the pattern generator 8 and from the character generator 9 are synthesized in a logic sum circuit 10, and are supplied to a color printer 11, composed for example of an ink jet printer or a laser beam printer, for obtaining a colored record synthesized of characters, symbols, etc., and of images on a recording material such as paper, after suitable color signal processing such as complementary color conversion, background color removal etc.

Figure 2:
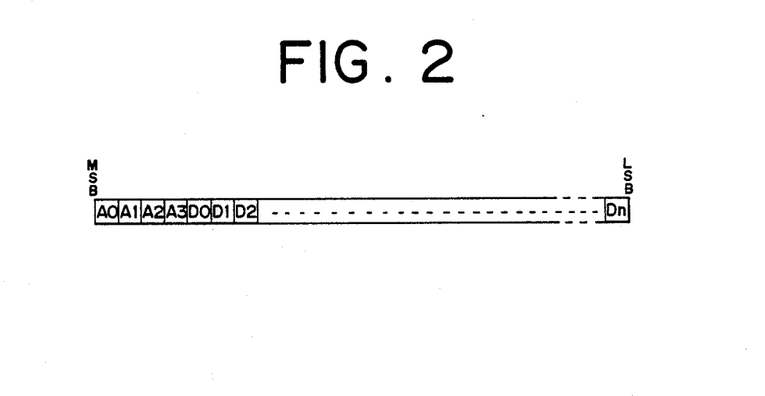
FIG. 2 is a chart showing a data format.

FIG. 2 shows an example of the format of data of a word transmitted on the transmission channel L characters MSB and LSB identifying the most and least significant bits, respectively. The upper 4 bits A0–A3 constitute a discrimination code for identifying the data content in the data discriminating unit 12, and the following bits D0–Dn constitute the code data or image data. More specifically, the discrimination code A0 "0" indicates that the bits D0–Dn represent code data, and the code A0 "1" indicates that said bits D0–Dn represent image data.

Figure 3:
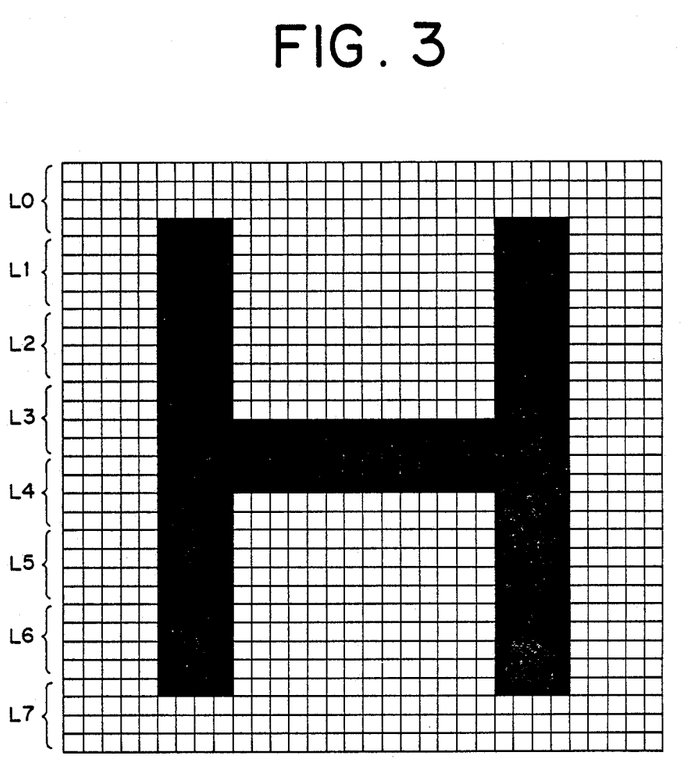
FIG. 3 is a schematic view showing the structure of a front memory.

If the discrimination code bit A0 is "1", representing image data, the bits D0–Dn represent anyone of the density patterns composed of 4×4 matrices per pixel as shown in FIG. 4. For example 5-bit data may be employed for indicating the number of black dots in said 4×4 matrix. In this case the information of 4×4=16 bits can be compressed to 5/16, with resulting improvement in the efficiency of transmission. Also, in the case that the discrimination code bit A0 is "0" representing the code data, the following 3 bits A1–A3 constitute an address code for the font memory in the character generator 9. More specifically, in the case that a character or symbol is represented by a matrix of 32×32 dots as shown in FIG. 3, said matrix is divided, corresponding to the number of rows (4 dots) in each density pattern, into 8 groups $\overline{L0-L7}$ each composed of 4×32 dots, and the discrimination code bits A1, A2, A3 are used for selecting the groups L0–L7 in the font memory. For example, a code:

A0A1A2A3D0D1D2...Dn=0000XXX...X instructs an access, corresponding to a character represented by code data XXX...X, to the font of the group L0, i.e. the uppermost 4×32 dots. Also a code:

A0A1A2A3D0D1D2...Dn=0001XXX...X instructs an access, corresponding to a character represented by code data XXX...X, to the font of the group L1, i.e. 4×32 dots from the 5th to 8th rows. Similarly the code bits A0A1A2A3="0010" instructs an access to the group L2, "0011" to the group L3, "0100" to the group L4,..., "0111" to the group L7.

On the other hand, in the case that the discrimination code bit A0 is "1" representing image data, the following 3 bits A1–A3 are used for designating the color of the image data represented by the bits D0–Dn. For example the code bits A0A1A2A3="1000", "1010", "1100" or 37 1110" respectively represent red, green, blue or black. Thus, a code:

A0A1A2A3D0D1D2...Dn=1010XXX...X indicates that the input data are green image data of a density pattern corresponding to a brightness XXX...X. Also a code:

A0A1A2A3D0D1D2...Dn=1110XXX...X indicates that the input data are black image data corresponding to a brightness XXX...X.

A discrimination code A0A1A2A3="1111" is used as a printer control signal such as a carriage return signal or a skip signal, regardless of the value of the following bits D0–Dn.

Figure 5:
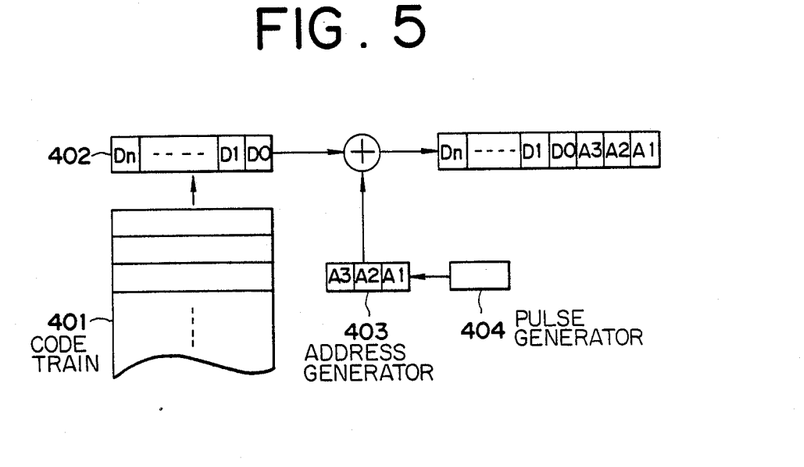
FIG. 5 is a schematic view explaining the transmission operation.

The transmitting station 1 serially scans, with color separation, an original image to be transmitted by means of line image sensors to generate density data shown in FIG. 4 corresponding to the density information obtained in said scanning, and releases or outputs said density data D0–Dn after adding a bit A0=1 representing image data and color discriminating code bits A1–A3 in the layout unit 4. On the other hand, in the case of transmitting characters, symbols, etc., as shown in FIG. 5, a code train 401 stored in a memory corresponding to document information prepared in the document preparation unit 3 (FIG. 1) is serially taken out and stored in a register 402. Said code, stored in the register 402, is released after addition of a 3-bit code A1–A3 for addressing the font memory and a code bit A0="0" representing a code data in the address generator 403. The address generated by the address generator 403 is stepwise increased at each entry of a pulse from a pulse generator 404 which is activated at each scanning, i.e. at each entry of the carriage return signal, while the character code D0–Dn corresponding to plural characters or symbols constituting a same line is repeatedly released 8 times.

Thus, in the mixed transmission of characters, symbols, etc., and images, the receiving station can carry out the recording operation for the characters, symbols, etc., in the same manner as for an image read from the original, since the font memory is accessed each time for a number of lines corresponding to the dimension of the unit pixel composed of a density pattern.

In the receiving station, such received data may be stored in a magnetic or optical memory. Also the transmitted image data need not be limited to density patterns representing density levels, but can be data subjected to suitable data compression, for example compression by MH (modified huffman) codes. In such case the transmitting station is required to have a signal compressing circuit, while the receiving station is required to have a signal expanding circuit. Also the recording or storing operation may be conducted only on either of the kinds of transmitted data, since the separation thereof is quite easy.

Furthermore, the image data transmitted from the transmitting station may be obtained from a color television camera, or from an image memory such as a magnetic memory. Also the information composed of characters, symbols, etc., may be obtained for example from a word processor or an office computer.

As explained in the foregoing, the image data and the code data representing characters and symbols are exactly distinguished even when they are transmitted through a common transmission channel, and the characters or symbols can be handled in dimensionally compatible manner. Also the present invention prevents the increase in cost since it does not require increase in the dimension of the font memory but only in the number of addresses thereof.

Naturally the dimension of the font memory is no limited to 32×32 dots but may be suitably selected according to the output device such as the printer.

The data of characters or symbols to be synthesized with the image data may be obtained not only from a document preparation unit such as a word processor but also from an output device for releasing the time and data of transmission or a number indicating the numbers or pages of the original.

Furthermore, the receiving station may show the synthesized image on a display unit such as a cathode ray tube, in addition to image recording on a recording material.

Furthermore, the image data and the code data may be transmitted in a predetermined order on the transmission channel, for example the image data at first in collective manner and then the code data also in collective manner. Naturally mixed transmission in random order is also possible.

Figure 6:
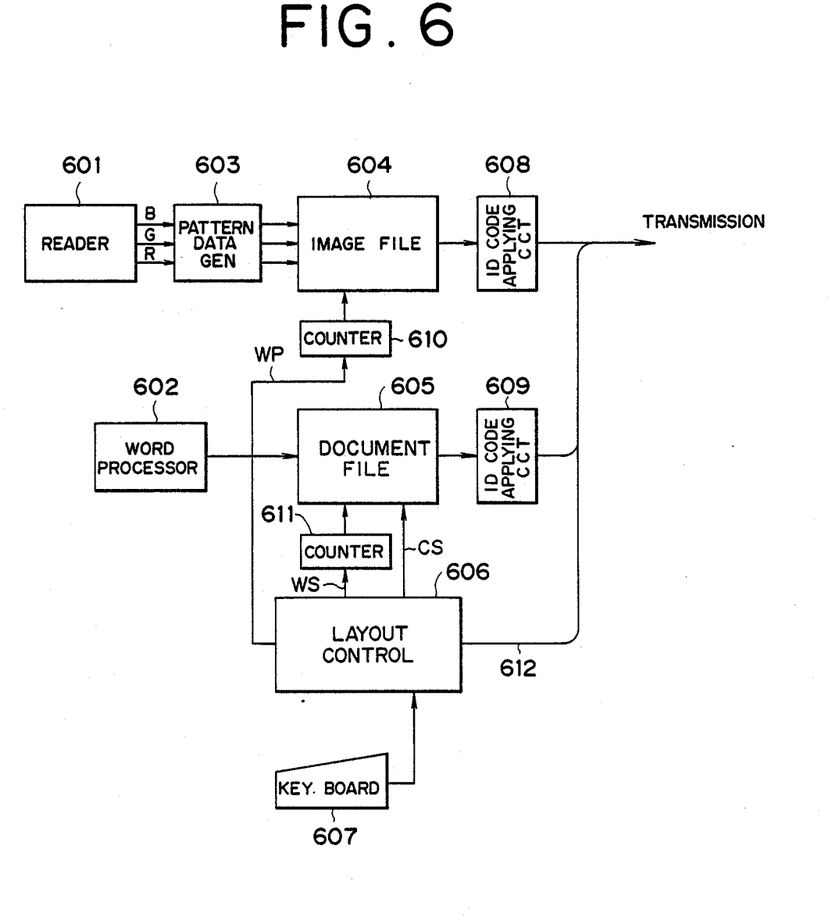
FIG. 6 is a detailed block diagram of a transmission station.
Figure 7A:
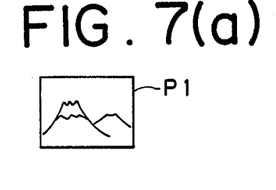
FIGS. 7(a)–7(d), is a schematic view showing examples of image and character information.
Figure 7B:
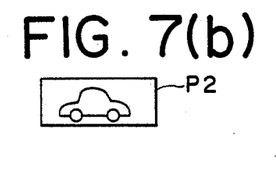
Figure 7C:
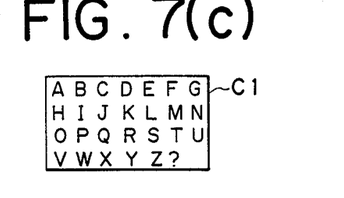
Figure 7D:
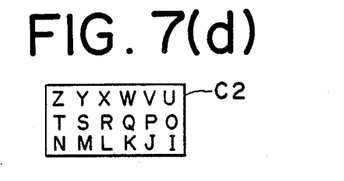

FIG. 6 shows, in a block diagram, another embodiment of the transmitting station 1 shown in FIG. 1, wherein a reader unit 601 photoelectrically reads an original with color separation to generate color image signals of blue (B), green (G) and red (R), while a word processor 602 equipped with a character/symbol input unit such as a keyboard for generating document information and releasing character code data corresponding to thus prepared document information.

The color image signals released from the reader unit 601 are supplied to a pattern data generator 603 for generating density pattern data for each of the entered color image signals. An image file 604, composed of a floppy disk or a semiconductor memory, can store image data composed of density pattern data, together with the color discriminating codes (A1-A3), corresponding to plural pages of the original.

On the other hand the character code data released from the word processor 602 are stored in a document file 605 similar to the above-mentioned image file.

FIG. 7, comprising FIGS. 7(a)-7(d), shows examples of image information P1, P2 read in the reader unit 601 and stored in the image file, and of character information C1 C2 prepared in the word processor 603 and stored in the document file.

In FIG. 6, a layout controller 606 performs layout functions such as rearrangement, change in magnification, erasure, etc., on the image information and character information supplied from the reader unit 601 and word processor 602, according to layout information to be supplied by the operator through a keyboard 607.

Figure 8:
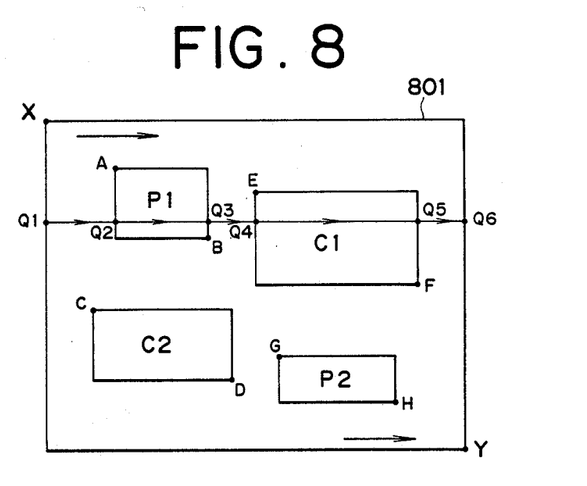
FIG. 8 is a schematic view showing the state of a layout memory.

The layout controller 606 is provided with a layout table for storing the layout information entered from the keyboard 607. Said layout table corresponds to the recording area of the receiving station, as shown in FIG. 8. The layout table 801 shown in FIG. 8 illustrates an example of layout of the information shown in FIGS. 7(a)-7(d), wherein the image information P1 is allotted to an area defined by points A and B, the image information P2 to an area defined by points G and H, the character information C1 to an area defined by points E and F, and the character information C2 to an area defined by points C and D, while the margins outside said areas are left as white.

At the transmission of said information subjected to the layout operation, the image file 604 and the document file 605 release signals for each row, according to output instructions supplied from the layout controller. Identification code applying circuits 608, 609 attach the aforementioned data discriminating bit A0 in front of the data respectively released from the image file 604 and document file 605.

Counters 610, 611 respectively count readout signals WP, WS for said files supplied from the layout controller 606. A character position signal CS is used for setting the aforementioned bits A1-A3 indicating the access position to the font memory.

In response to a transmission start signal, the layout controller 606 starts the scanning of the layout table 801, in a direction to the right from a point X shown in FIG. 8 and finally reaching a point Y. Now let us consider a case of scanning from a point Q1 to another point Q6. In a portion from the point Q1 to a point Q2, not corresponding to an image or character layout area, the layout controller 606 releases a blank signal (A0A1A-2A3D0D1 . . . Dn=111100 . . . 0) indicating a white image, through a line 612. In a portion form the point Q2 to a point Q3, falling within a layout area for the image information P1, there is output the image file readout signal WP, which is counted by the counter 610 as explained before to release determined data from the image file 604 in response to said counting. In this manner the layout memory is scanned, and, when the scanning reaches the front end of the layout area P1, the signal WP is released to shift the counter 610 to a count "1", thereby releasing the image data of the first line from the image file 604. Subsequently, when the scanning next reaches the layout area P1, the signal WP is released again to shift the counter 610 to a count "2", thereby releasing the image data of the second line from the image file 604. In this manner the count of the counter 610 is stepwise advanced every time the scanning reaches the layout area, thereby selecting the row of the image data to be read from the image file 604.

In a portion from the point Q3 to a point Q4, again corresponding to a non-layout area, the layout controller 606 again releases the aforementioned blank signal.

In a succeeding portion from the point Q4 to a point Q5, corresponding to a layout area of the character information C1, the layout controller 606 releases a document file readout signal WS, which is counted by a counter 611 to release determined data from the document file 605. In the present embodiment the font memory is divided into 8 groups (L0-L7) for successive accesses, so that the stepwise increment of the counter 611 takes place after counting the signal WS eight times to release the character code data corresponding to a succeeding row of characters from the document file 605. A signal CS, for designating groups (positions) in the font memory, is used for attaching position codes (A1-A3) to the character code data obtained by said access, according to the count of the counter 611.

In a portion from the point Q5 to the point Q6, corresponding to a non-layout area, the layout controller 606 releases the aforementioned blank signal. When the scanning reaches the point Q6, i.e. the right-hand end of the layout table 801, the layout controller 606 releases the carriage return signal through a line 612.

Thus, in the course of raster scanning of the layout table 801, the layout controller 606 releases the readout signal WP or WS respectively when said scanning reaches an image layout area or a character layout area, thereby causing data readout from the image file 604 or the document file 606. In this manner there is obtained information containing the image data and the character code data in mixed manner. Said counters 610, 611 are cleared at the rear end of the layout area.

Figure 9:
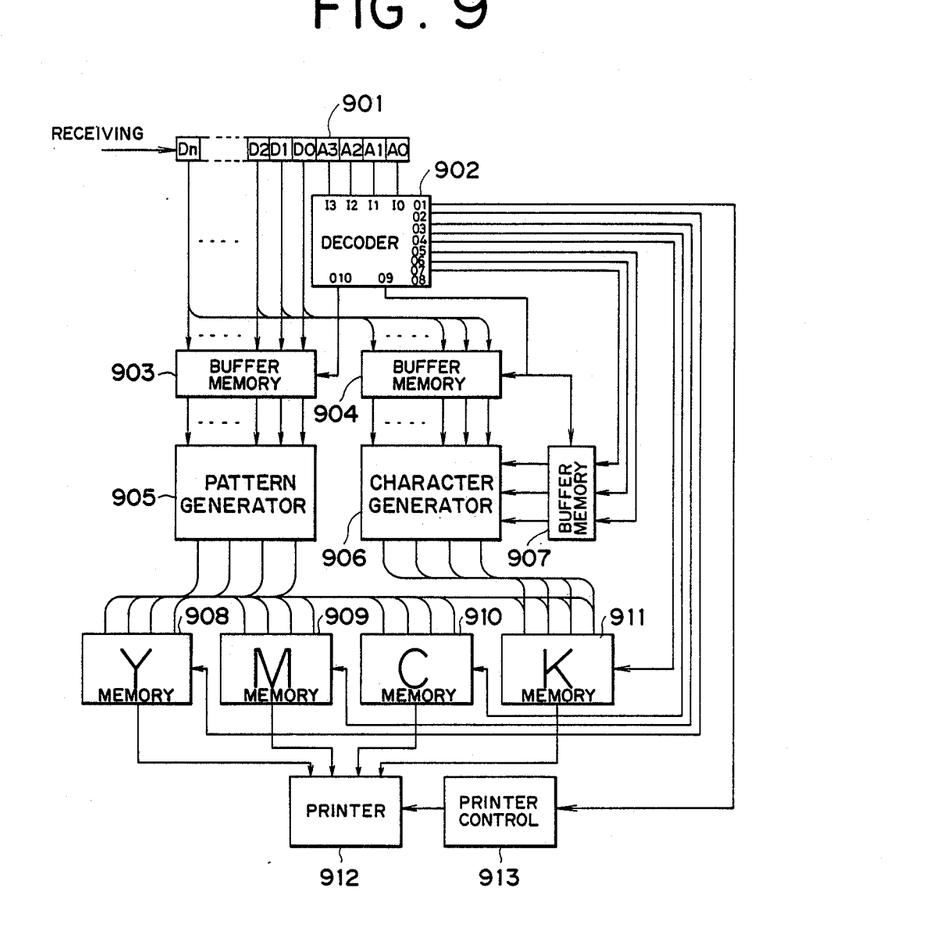
FIG. 9 is a detailed block diagram of a receiving station.

FIG. 9 shows, in a block diagram, another embodiment of the receiving station shown in FIG. 1, adapted for receiving the data transmitted from the transmitting station shown in FIG. 6 and recording a synthesized image on the recording material.

The data transmitted from the transmitting station are entered into a shift register 901. Upon said data being entered in the register 901, the first four bits (A0-A3) are supplied to a decoder 902, which discriminates, from said discrimination codes A0-A3, whether the succeeding data bits D0-Dn represent image data, character code or a printer control signal, and releases additional data such as color data in case of image data, or data on access position to the font memory in case of character code data.

If discrimination code A0A1A2A3="1111" is detected by decoder 901, then output line 01 is activated. As previously described with reference to FIG. 1, this code is used as a printer control signal such as a carriage return signal or a skip signal, and is applied to printer control 913.

An output line 09 of the decoder 902 is activated when the succeeding data bits D0-Dn are identified to represent character code data, while an output line 010 is activated when said bits D0-Dn are identified to represent image data. Said output signals 09, 010 respectively enable buffer memories 904, 903 to store the data D0-Dn in the shift register 901. In this manner the decoder discriminates the nature of the data to select a suitable buffer memory, thus classifying the data.

In case of the discrimination code A0="1" indicating that the following data D0-Dn are image data, the buffer memory 903 is enabled by the output 010 of the decoder 902, thus accepting the data D0-Dn. Also the decoder 902 identifies the color of said data D0-Dn from the discrimination codes A1-A3 to release corresponding output signal 02, 03, 04 or 05 respectively indicating blue, green, red or black. Said output signals 02-05 respectively enable memories 908-911 for respective colors for data reception.

The image data stored in the buffer memory 903, representing the white/black dot ratio per unit area as explained before, are supplied to a pattern generator 905, which is provided with a table containing 17 patterns shown in FIG. 4 and releases a dot pattern corresponding to the input image data. Said dot pattern corresponds to the signal yellow (Y), magenta (M) or cyan (C) obtained by complementary color conversion from the signals B, G, R.

The dot pattern released from the pattern generator 905 is stored in one of the memories 908-911 which are selected by the output signals 02-05 of the decoder 902 as explained before.

On the other hand, in case of the discrimination code A0="0" indicating that the following data D0-Dn are character code data, the buffer memory 904 accepts said data D0-Dn in response to the output signal 09 from the decoder 902. The decoder 902 also identifies the group of the font memory under access from the discrimination codes A1-A3, and releases output signals 06-08 indicating said group.

Said output signals 06-08 are stored in a buffer memory 907 enabled by the output signal 09 of the decoder 902.

The data stored in the buffer memory 904 are supplied then to a character generator 906 storing character font, thus making access to a character indicated by the data D0-Dn. On the other hand the buffer memory 907 indicates a position in the character, so that the character generator 906 releases dot data of a determined position of a character selected by the data D0-Dn. In the present embodiment the characters are recorded in black, so that the dot data from the character generator 906 are stored in the black memory 911.

As explained in the foregoing, the data D0-Dn entered in the shift register 901 are discriminated as to whether they represent image data or character code data, and are stored in the memories 908-911 after conversion into dot patterns by processes according to the results of said discrimination.

When dot data of at least a line are stored in the memories 908-911, said data are supplied to a printer 912 which, under control of printer control 913, executes color recording in the known manner according to the dot data Y, M, C, K stored in said memories 908-911, and synthesizing the characters and the image read from the original.

In the foregoing and following embodiments the data of different kinds are transmitted through a common transmission channel, but some of the present invention are applicable to a case in which a synthesized image is produced from the information of different kinds transmitted through different transmission channels. Also the data of different kinds may be transmitted in a random order or in a predetermined order.

Figure 10:
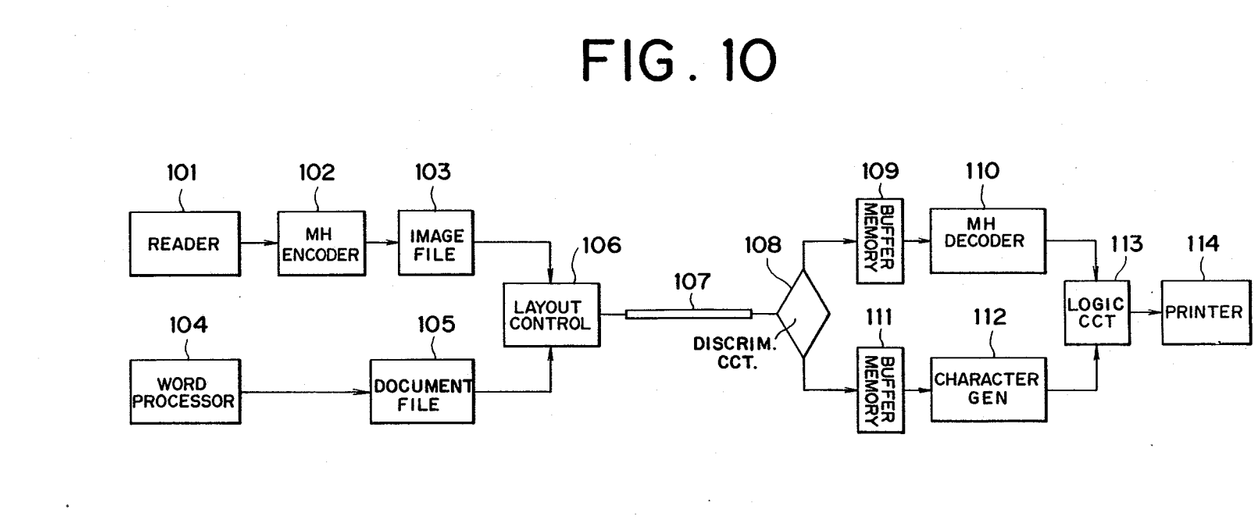
FIG. 10 is a block diagram showing another embodiment of the data transmission system.

FIG. 10 shows another embodiment in a block diagram, wherein the image information obtained by reading an original is transmitted not in density patterns but in signals compressed by modified Huffman (MH) process.

In FIG. 10, a reader 101 photoelectrically reads an original to be transmitted with an image sensor such as a charge-coupled device (CCD) to generate binary signals representing black and white pixels in the unit of a line. The serial binary signals released from the reader 101 are subjected to one-dimensional MH compression in an MH encoder 102 and are stored in an image file 103 composed for example of a floppy disk. On the other hand, character data prepared in a word processor 104 are stored, in the form of ASCII codes, in a document file 105.

A layout controller 106 performs the layout of the image and the characters according to the instruction of the operator or to a determined format as explained before, thus controlling the output from the image file 103 and from the document file 105 and supplying the compressed image data and character code data in succession to a transmission channel 107. The discrimination codes as explained before are attached to the front end of each data.

A discrimination circuit 108 identifies, by the discrimination codes, the data transmitted through the transmission channel 107 and guides said data to an appropriate processing circuit.

The compressed image data are supplied, through a buffer memory 109, to an MH decoder 110 for expansion and converted into dot patterns. On the other hand, the character code data are supplied through a buffer memory 111 to a character generator 112 for conversion into dot patterns by means of a font memory.

The dot pattern data supplied from said MH decoder 110 and character generator 112 are synthesized in a logic sum circuit 113 and supplied to a printer 114 for image recording onto a recording material, in the layout selected by the layout controller 106 and synthesized from the image read in the reader 101 and the characters entered by the word processor 104.

Also in the present embodiment, the reader may be replaced by an image information output device such as an electronic file, and the word processor may be replaced by an office computer or the like. Besides the present invention is applicable also to a case in which the data of different kinds are transmitted through different transmission channels.

Also the signal compression can be achieved not only by the modified Huffman method but also by other methods, such as a two-dimensional compression for example the modified READ (Relative Element Address Designate) method.

The present invention has thus far been explained by certain embodiments thereof, but the present invention is not limited to such embodiments but is subject to various modifications and variations within the scope and spirit of the appended claims.

What is claimed is:

1. A data processing system comprising:
   image data output means for outputting image data;
   code data output means for outputting groups of code data, the groups collectively representing a font pattern such as a character or a symbol; and
   send out means for sending out to a common signal circuit the image data from said image data output means and the code data from said code data output means,
   said image data output means outputting the image data to said send out means in units of a first predetermined number of lines, and said code data output means outputting to said send out means a group of code data representative of a second predetermined number of lines of the font pattern,
   wherein the second predetermined number of lines is equal to the first predetermined number of lines.

2. A system according to claim 1, wherein said image data output means outputs encoded image data.

3. A system according to claim 2, wherein the encoded image data represents a density pattern.

4. A system according to claim 1, wherein the image data comprises color image data.

5. A system according to claim 1, wherein each group of code data includes a position code representing a part of the font pattern corresponding to the first predetermined number of lines of image data.

6. A system according to claim 1, wherein said signal circuit comprises a communication line, and said send out means comprises transmission means for transmitting data through said communication line.

7. A system according to claim 1, wherein the image data comprises image data subjected to a signal compression process.

8. A system according to claim 1, wherein each group of code data comprises an ASCII code.

9. A data processing system comprising:
   input means for inputting data received from a signal circuit;
   separating means for separating the received data into image data and into a group of code data representing a part of a font pattern such as a character or a symbol;
   image data process means for processing the image data separated by said separating means;
   code data process means for processing the code data separated by said separating means; and
   output means for outputting the processed image data from said image data process means and the processed code data from said code data process means,
   said image data process means processing the image data in units of a first predetermined number of lines, and
   said code data process means outputting to said output means one of a plurality of groups of font data representing a second predetermined number of lines of the font pattern corresponding to the part of the font pattern, said groups of font data collectively representing the font pattern,
   wherein the second predetermined number of lines is equal to the first predetermined number of lines.

10. A system according to claim 9, wherein the image data is encoded image data, and said image data process means decodes the encoded image data into dot data.

11. A system according to claim 10, wherein the encoded image data represents a density pattern.

12. A system according to claim 9, wherein the image data comprises compressed image data, and said image data process means expands the compressed image data.

13. A system according to claim 9, wherein the image data comprises color image data.

14. A system according to claim 9, wherein the group of code data includes a position code representing a part of the font pattern corresponding to the first predetermined number of lines of image data.

15. A system according to claim 14, wherein the position code is part of an address code of a character generator.

16. A system according to claim 9, wherein said image data process means outputs dot data to said output means, and wherein said output means comprises combination means for combining the dot data and the font data and for outputting the combined dot and font data.

17. A system according to claim 16, wherein said output means further comprises record means for recording the combined dot and font data.

18. A system according to claim 9, wherein a first discrimination code is attached to the image data and a second discrimination code is attached to the group of code data, and wherein said separating means separates the received data on the basis of the first and second discrimination codes.

19. A system according to claim 18, wherein the first discrimination code attached to the image data includes color information.

20. A system according to claim 9, wherein said signal circuit comprises a communication line, and said input means comprises receive means for receiving data through the communication line.

21. A data processing system comprising:
   a transmission unit including:
      image data output means for outputting image data in units of a first predetermined number of lines,
      code data output means for outputting one of plurality of groups of code data, the groups collectively representing a font pattern such as a character or a symbol each group of code data representing a second predetermined number of lines of the font pattern, the second predetermined number of lines being equal to the first predetermined number of lines, and
      transmission means for transmitting the image data from said image data output means and the code data from said code data output means through a common communication circuit; and
   a reception unit including:

receive means for receiving the image data and the code data from the common communication circuit, separating means for separating the data received by said receive means into image data and code data image data process means for processing the separated image data in units of the first predetermined number of lines, code data process means for processing the separated code data, and output means for outputting the processes image data from said image data process means and the processed code data from said code data process means.

22. A system according to claim 21, wherein said image data output means outputs encoded image data.

23. A system according to claim 22, wherein the encoded image data represents a density pattern.

24. A system according to claim 21, wherein the image data comprises color image data.

25. A system according to claim 21, wherein each group of code data includes a position code representing a part of the font pattern corresponding to the first predetermined number of lines of image data.

26. A system according to claim 21, wherein the image data comprises image data subjected to a signal compression process.

27. A system according to claim 21, wherein each group of code data comprises an ASCII code.

28. A system according to claim 21, wherein the image data is encoded image data, and said image data process means decoded the encoded image data into dot data.

29. A system according to claim 28, wherein each group of code data includes a position code representing a of the font pattern corresponding to the first predetermined number of lines of image data.

30. A system according to claim 29, wherein said code data process means comprises a character generator and reads out from said character generator font data corresponding to the second predetermined number of lines of the font pattern represented by the code data, on the basis of the code data.

31. A system according to claim 30, wherein the position code is part of an address code of said character generator.

32. A system according to claim 30, wherein said image data process means outputs dot data to said output means and said code data process means outputs the font data to said output means, and wherein said output means comprises combination means for combining the dot data and the font data and for outputting the combined dot and font data.

33. A system according to claim 32, wherein said output means further comprises record means for recording the combined dot and font data.

34. A system according to claim 21, wherein the image data comprises compressed image data, and said image data process means expands the compressed image data.

35. A system according to claim 21, wherein a first discrimination code is attached to the image data and a second discrimination code is attached to the code data, and wherein said separating means separates the received data on the basis of the first and second discrimination codes.

36. A system according to claim 35, wherein the first discrimination code attached to the image data includes color information.

37. A data processing method comprising the steps of:
producing image data;

producing groups of code data, the groups collectively representing a font pattern such as a character or a symbol;

outputting the image data in units of a first predetermined number of lines; and outputting one of the groups of code data such that the outputted group of code data represents a second predetermined number of lines of the font pattern, the second predetermined number of lines being equal to the first predetermined number of lines.

38. A method according to claim 37, wherein the image data comprises encoded data.

39. A method according to claim 38, wherein the encoded image data comprises compressed data.

40. A method according to claim 38, wherein the encoded image data represents a density pattern.

41. A method according to claim 38, wherein said image data outputting step and said code data outputting step each include a step of attaching a discrimination code to the image data or to the code data, respective.

42. A method according to claim 37, wherein the image data comprises color image data.

43. A method according to claim 42, wherein said image data outputting step includes a step of attaching color information to the image data.

44. A method according to claim 37, wherein said code data outputting step includes a step of adding position code information representing a part of the font pattern to the code data.

45. A data processing method comprising the steps of:
producing image data;

producing code data representing a font pattern such as a character or a symbol;

outputting the image data in units of a first predetermined number of lines;

adding to the code data position code information presenting a part of the font pattern having a second predetermined number of lines equal to the first predetermined number of lines; and outputting the code data with the added position code information.

46. A method according to claim 45, wherein the image data comprises encoded data.

47. A method according to claim 46, wherein the encoded image data comprises compressed data.

48. A method according to claim 46, wherein the encoded image data represents a density pattern.

49. A method according to claim 46, wherein the encoded image data comprises color image data.

50. A method according to claim 49, wherein said image data outputting step includes a step of attaching color information to the image data.

51. A method according to claim 46, wherein said image data outputting step and said code data outputting step each include a step of attaching a discrimination code to the image data or to the code data, respectively.

52. A data processing system comprising:
image data output means for outputting image data;

code data output means for outputting code data representing a font pattern such as a character or a symbol, the font pattern having the same resolution as the image data; and send out means for sending out to a common signal circuit the image data from said image data output means and the code data from said code data output means, said image data output means outputting the image data to said send out means in units of a first predetermined number of lines, and said code data output means outputting to said send out means code data representative of a second predetermined number of lines of the font pattern, wherein the second predetermined number of lines is equal to the first predetermined number of lines.

53. A system according to claim 52, wherein said image data output means outputs encoded image data.

54. A system according to claim 53, wherein the encoded image data represents a density pattern.

55. A system according to claim 52, wherein the image data comprises color image data.

56. A system according to claim 52, wherein the code data includes a position code representing a part of the font pattern corresponding to the first predetermined number of lines of image data.

57. A system according to claim 52, wherein said signal circuit comprises a communication line, and said send out means comprises transmission means for transmitting data through said communication line.

58. A data processing system comprising:
input means for inputting data received from a signal circuit;
separating means for separating the received data into image data and into code data representing a font pattern such as a character or a symbol, the font pattern having the same resolution as the image data;
image data process means for processing the image data separated by said separating means;
code data process means for processing the code data separated by said separating means; and
output means for outputting the processed image data from said image data process means and the processed code data from said code data process means,
said image data process means processing the image data in units of a first predetermined number of lines, and
said code data process means outputting to said output means font data representing a second predetermined number of lines of the font pattern, wherein the second predetermined number of lines is equal to the first predetermined number of lines.

59. A system according to claim 58, wherein the image data is encoded image data, and said image data process means decodes the encoded image data into dot data.

60. A system according to claim 59, wherein the encoded image data represents a density pattern.

61. A system according to claim 58, wherein the image data comprises compressed image data, and said image data process means expands the compressed image data.

62. A system according to claim 58, wherein the image data comprises color image data.

63. A system according to claim 58, wherein the code data includes a position code representing a part of the font pattern corresponding to the first predetermined number of lines of image data.

64. A system according to claim 63, wherein said code data process means comprises a character generator and reads out from said character generator font data corresponding to the second predetermined number of lines of the font pattern represented by the code data, on the basis of the code data.

65. A system according to claim 63, wherein the position code is part of an address code of a character generator.

66. A system according to claim 58, wherein said image data process means outputs dot data to said output means, and wherein said output means comprises combination means for combining the dot data and the font data and for outputting the combined dot and font data.

67. A system according to claim 66, wherein said output means further comprises record means for recording the combined dot and font data.

68. A system according to claim 58, wherein a first discrimination code is attached to the image data and a second discrimination code is attached to the code data, and wherein said separating means separates the received data on the basis of the first and second discrimination codes.

69. A system according to claim 68, wherein the first discrimination code attached to the image data includes color information.

70. A system according to claim 58 wherein said signal circuit comprises a communication line, and said input means comprises receive means for receiving data through the communication line.

* * * * *

UNITED STATES PATENT AND TRADEMARK OFFICE
CERTIFICATE OF CORRECTION

PATENT NO. : 4,819,063
DATED : April 4, 1989
INVENTOR(S) : SUSUMU SUGIURA, ET AL.

It is certified that error appears in the above-identified patent and that said Letters Patent is hereby corrected as shown below:

COLUMN 3

Line 9, "channel L" should read --channel L,--.
Line 20, "anyone" should read --any one--.
Line 58, "37 1110"" should read --"1110"--.

COLUMN 4

Line 42, "huffman)" should read --Huffman)--.
Line 64, "no" should read --not--.

COLUMN 6

Line 13, "form" should read --from--.

COLUMN 10

Line 59, "symbol" should read --symbol,--.

COLUMN 11

Line 6, "data" should read --data,--.
Line 12, "processes" should read --processed--.
Line 33, "decoded" should read --decodes--.
Line 37, "a of" should read --a part of--.

UNITED STATES PATENT AND TRADEMARK OFFICE
CERTIFICATE OF CORRECTION

PATENT NO. : 4,819,063
DATED : April 4, 1989
INVENTOR(S) : SUSUMU SUGIURA, ET AL.  Page 2 of 2

It is certified that error appears in the above-identified patent and that said Letters Patent is hereby corrected as shown below:

COLUMN 12

Line 27, "tive." should read --tively.--.
Line 44, "presenting" should read --representing--.

Signed and Sealed this

Twenty-seventh Day of March, 1990

Attest:

JEFFREY M. SAMUELS

Attesting Officer  Acting Commissioner of Patents and Trademarks